(12) United States Patent
Chiu

(10) Patent No.: US 7,593,141 B2
(45) Date of Patent: Sep. 22, 2009

(54) IMAGE APPARATUS WITH BATCH SCAN AND REAL TIME DISPLAY AND METHOD OF THE SAME

(76) Inventor: Chui-Kuei Chiu, 215, Sec. 1, Heng-Shan St., Heng-Shan Tsun, Heng-Shan Hsiang, Hsin-Chu (TW)

( * ) Notice: Subject to any disclaimer, the term of this patent is extended or adjusted under 35 U.S.C. 154(b) by 821 days.

(21) Appl. No.: 09/990,291

(22) Filed: Nov. 23, 2001

(65) Prior Publication Data

US 2003/0099004 A1 May 29, 2003

(51) Int. Cl.
*H04N 1/04* (2006.01)
(52) U.S. Cl. .................. 358/474; 358/501; 358/505; 358/1.15; 348/101; 348/345; 382/274
(58) Field of Classification Search ............ 358/474, 358/1.16, 505, 506, 523, 527, 448, 486, 501, 358/1.15, 404, 409, 485, 471; 348/101, E5.05, 348/9.009, 333.11, 345 E; 382/167, 274, 382/275
See application file for complete search history.

(56) References Cited

U.S. PATENT DOCUMENTS

| | | | | |
|---|---|---|---|---|
| 3,928,719 A * | 12/1975 | Sasabe et al. | ............... | 348/110 |
| 4,141,347 A * | 2/1979 | Green et al. | ............... | 600/441 |
| 4,665,555 A | 5/1987 | Alker et al. | | |
| 4,730,262 A * | 3/1988 | Watanabe et al. | ........... | 345/440 |
| 4,761,641 A * | 8/1988 | Schreiber | .................... | 345/1.3 |
| 4,780,712 A * | 10/1988 | Itaya et al. | .................. | 345/534 |
| 4,890,249 A * | 12/1989 | Yen | .............................. | 703/13 |
| 4,952,920 A * | 8/1990 | Hayashi | ....................... | 345/658 |
| 6,011,635 A * | 1/2000 | Bungo et al. | ................. | 358/488 |
| 6,088,121 A * | 7/2000 | Baumann | .................... | 358/1.18 |
| 6,460,069 B1 * | 10/2002 | Berlin et al. | ................ | 709/201 |
| 6,501,901 B2 * | 12/2002 | Yasuda et al. | ................. | 386/52 |
| 6,501,920 B2 * | 12/2002 | Goto et al. | ..................... | 399/81 |
| 6,502,754 B1 * | 1/2003 | Bhatia et al. | ........... | 235/472.01 |
| 6,646,765 B1 * | 11/2003 | Barker et al. | ................ | 358/474 |
| 6,661,228 B2 * | 12/2003 | Haworth et al. | ............. | 324/309 |
| 6,952,281 B1 * | 10/2005 | Irons et al. | ................. | 358/1.15 |
| 7,050,650 B2 * | 5/2006 | Maurer et al. | ............... | 382/275 |
| 7,051,271 B1 * | 5/2006 | Chiu et al. | ................... | 715/203 |
| 7,167,257 B2 * | 1/2007 | Matsuda | ..................... | 358/1.15 |
| 7,227,576 B2 * | 6/2007 | Umeyama | .............. | 348/333.11 |
| 7,251,064 B2 * | 7/2007 | Chiu | .......................... | 358/504 |
| 7,443,546 B2 * | 10/2008 | Chiu | .......................... | 358/406 |
| 2002/0113590 A1 * | 8/2002 | Haworth et al. | ............. | 324/309 |

(Continued)

*Primary Examiner*—Houshang Safaipour
*Assistant Examiner*—Negussie Worku
(74) *Attorney, Agent, or Firm*—Stolowitz Ford Cowger LLP

(57) ABSTRACT

An image apparatus with batch scan and real time display and a method of the same are provided. The method of the present invention comprises steps of utilizing a transmission device for transmitting pictures into the scanner sequentially, scanning a picture and storing digital data in memory, displaying a notify signal to notice the user simultaneously while the scan is finished, showing the scanned image in a display device and scanning next picture at the same time while the user changes a switch control device. It is provided for shortening the scanning time of an image and reducing the time of waiting by utilizing the ways of batch scan and real time display. The present invention can increase number and size of picture to be scanned and thereby promote the scanning efficiency without requiring the increase in size of a memory buffer.

40 Claims, 4 Drawing Sheets

U.S. PATENT DOCUMENTS

| | | | | |
|---|---|---|---|---|
| 2002/0114024 A1* | 8/2002 | Chiu | ........................... | 358/505 |
| 2002/0154343 A1* | 10/2002 | Chiu et al. | ................... | 358/474 |
| 2004/0042050 A1* | 3/2004 | Chiu | ........................... | 358/406 |
| 2006/0023103 A1* | 2/2006 | Shiohara | ................. | 348/333.09 |
| 2007/0195189 A1* | 8/2007 | Kimoto | ....................... | 348/345 |

* cited by examiner

IMAGE APPARATUS WITH BATCH SCAN AND REAL TIME DISPLAY AND METHOD OF THE SAME

BACKGROUND OF THE INVENTION

1. Field of the Invention

The present invention generally relates to an image apparatus and a method, and more particularly to an image apparatus with batch scan and real time display and a method of the same.

2. Description of the Prior Art

In virtue of the prosperity of computer technology in the past few years, image process becomes more and more popular. Because of growth of science and technology, the mode of transmitting/receiving information has turned from simple written words into what is called the multimedia times. At the same time, multi-media signified that the delivering data contain words, images and so on. A variety of image processing devices has been generated for different requirements, and image processing devices include scanner, photostat, fax, digital camera and other image processing system etc.

With regard to an optical scanning device, it is a device for transferring a static image into digital data. A scanner is a device that converts a visible image such as a photograph, transparent slice or printed-paper into an electronic form for processing, saving, displaying or printing by a computer. In the prior art for scanning manner of scanners, a picture is placed on a scanner window. The scanners scan the picture by utilizing an image sensor from a transverse axis of an original picture and shift a belt vertically to scan the picture by a step motor. The scanners scan the picture and store the resultant image in a computer memory at last. Then, the image may be displayed upon a monitor. Consequently, general scanners that scan a picture often need several seconds and ten seconds at least that the time from the scanners starting to scan to the data transmitting back scanned image to the host device.

In light of scanning manners, scanning manners of scanners are divided into reflection type and transparence type. The scanner of reflection type comprises steps of placing a cold cathode fluorescent lamp as a light source among the scanner, projecting reflective light onto an opaque document such as a photograph, transforming a static image into digital data by receiving reflective light through an image sensor, and processing digital data by a personal computer further. The scanner of transparence type comprises steps of placing a cold cathode fluorescent lamp as a light source among the scanner, projecting transmissible light onto a transparent document such as a transparent slice, transforming a static image into digital data by receiving transmissible light through an image sensor, and processing digital data by a personal computer further.

In light of the scanner kinds, in general the scanner is divided into three types: handheld scanner, flatbed scanner and sheet-fed scanner. The first type is a handheld scanner that scans by a way of manual movement, wherein the scanning scope is littler, the scanning speed is slower, and the scanning quality is inferior. A flatbed scanner has higher resolution and larger scanning scope, but the drawbacks of the flatbed scanner are bulky volume and long scanning time. A sheet-fed scanner is an ADF (automatic document feeder) installed on a flatbed scanner, which scans the document rapidly by utilizing ADF. The only drawback of the scanner is that it cannot scan a whole book.

The dpi (dots per inch) is a unit of optical resolution for a scanner. If a high-resolution scan is performed by the machine, the scanning quality is better and the scanning time is longer. The digital images that derive from the scanner are displayed onto a display device by a display interface, wherein can pre-scan all pictures beforehand, save the data in memory, and then display those images sequentially. The disadvantages of this method are that the host device must have enough capacity of memory and the relatively increasing system cost. On the other hand, a method is provided for scanning one picture and displaying this picture immediately, which must wait for the scanning time. According to size and resolution of the picture, the scanning time often need several seconds and ten seconds at least that cannot display real time and merely waste time. Thus, it is imperative to develop a method and a system which reduces the time consuming scanning processes and thereby promotes the scanning efficiency without requiring the increase in size of a memory buffer.

Due to the above-mentioned reasons and the drawbacks that cannot convert a picture into electronic form by optical projecting device, it is imperative to develop a scanning device and a scanning method with synchronous scan and display in order to improve the drawbacks of the traditional projector. The objectives of the present invention are provided for promoting operating characteristic of the scanner, shortening the scanning time of the image and developing the efficiency of memory.

SUMMARY OF THE INVENTION

It is one objective of the present invention to provide an image apparatus with batch scan and real time display and a method of the same, which simultaneously scan a next picture and store in memory in case the user changes to display. When the user desires to show the picture, the scanned image is shown and the next picture is scanned at the same time for providing the use of next change. It is provided that the reduction of the time consuming on start preheated, stop process, and wait scan by the scanning system.

It is another object of this invention to provide an image apparatus with batch scan and real time display and a method of the same. A display frame provides a notify signal for representing to display forward image, backward image, or just scan next picture in time, and moreover user changes a switch control device to display the image that is desired.

It is a further object of this invention to provide an image apparatus with batch scan and real time display and a method of the same, which can promote number and size of a picture to be scanned without requiring the increase in size of a memory buffer.

It is another further object of this invention to provide an image apparatus with batch scan and real time display and a method of the same. The transmission device is mounted with the scanner, which can be a positive photograph holder, negative photograph holder, or ADF (automatic document feeder). It is provided for transmitting pictures automatically into the scanner to scan continuously such that the reduction of the manpower wasting on scanning processes.

In accordance with the above-mentioned objectives of the present invention, an image apparatus with batch scan and real time display and a method of the same are provided. The method of the present invention comprises steps of utilizing a transmission device for transmitting pictures automatically into the scanner, displaying a notify signal to notify the user while the scan is finish, pre-scanning the next picture and also storing in memory while the user changes to display, showing the scanned image and scanning the next picture at the same time for providing the use of next change. The notify signal is used for representing to display the forward image, backward image, or just scan the next picture, and the user changes a switch control device to display the image that is desired.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

Figure 1:
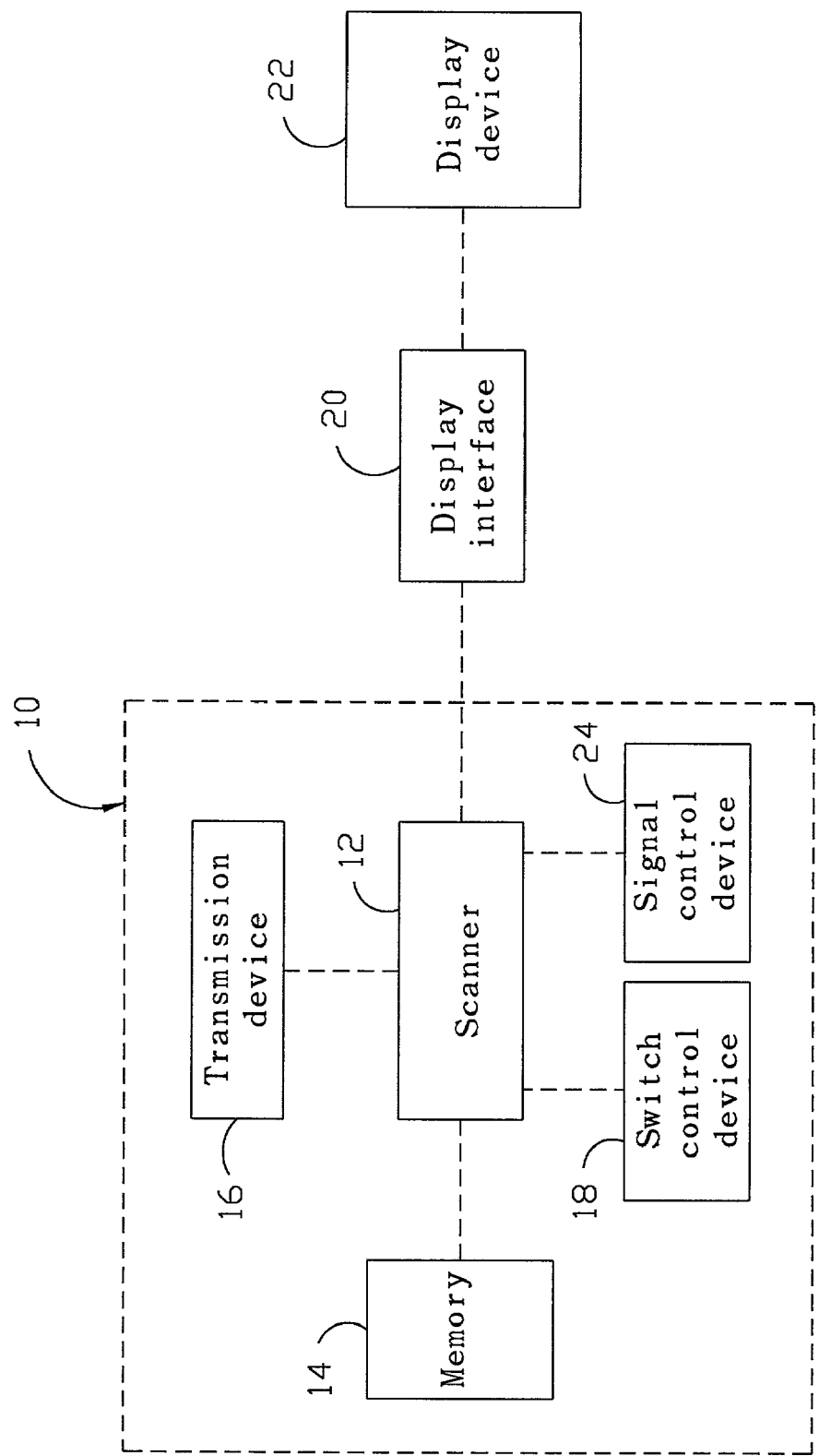
FIG. 1 is a schematic block diagram of an image scanning system in accordance with one embodiment of the present invention.

Referring to FIG. 1, in one embodiment of the invention, a schematic block diagram of an image scanning system 10 is shown. The image scanning system 10 comprises a scanner 12, memory 14, transmission device 16, switch control device 18 and signal control device 24. The scanner 12 is a device for transferring a plane picture into a digital form. The memory 14 is used for storing the digital information of the scanner 12. A ring buffer can be used as the memory 14. A ping-pong buffer can also be used as the memory 14. The scanner 12 mounts the transmission device 16 that is used as carrying inactive pictures. The transmission device 16 is provided for transmitting pictures automatically into the scanner to going on scanning. The switch control device 18 is coupled to the scanner 12, and furthermore the switch control device 18 is a switch to change the present image into next image or forward image. The signal control device 24 is comprised of an application specific integrated circuit (ASIC) that processes the switch signal and notices the transmission device 16 carrying the next picture into the scanner 12 to scan synchronously.

Then, the digital image from the image scanning system 10 is transmitted onto a display device 22 by a display interface 20. The digital image derives from the image scanning system 10 is transmitted by a display interface 20 and displayed onto a display device 22.

Figure 2:
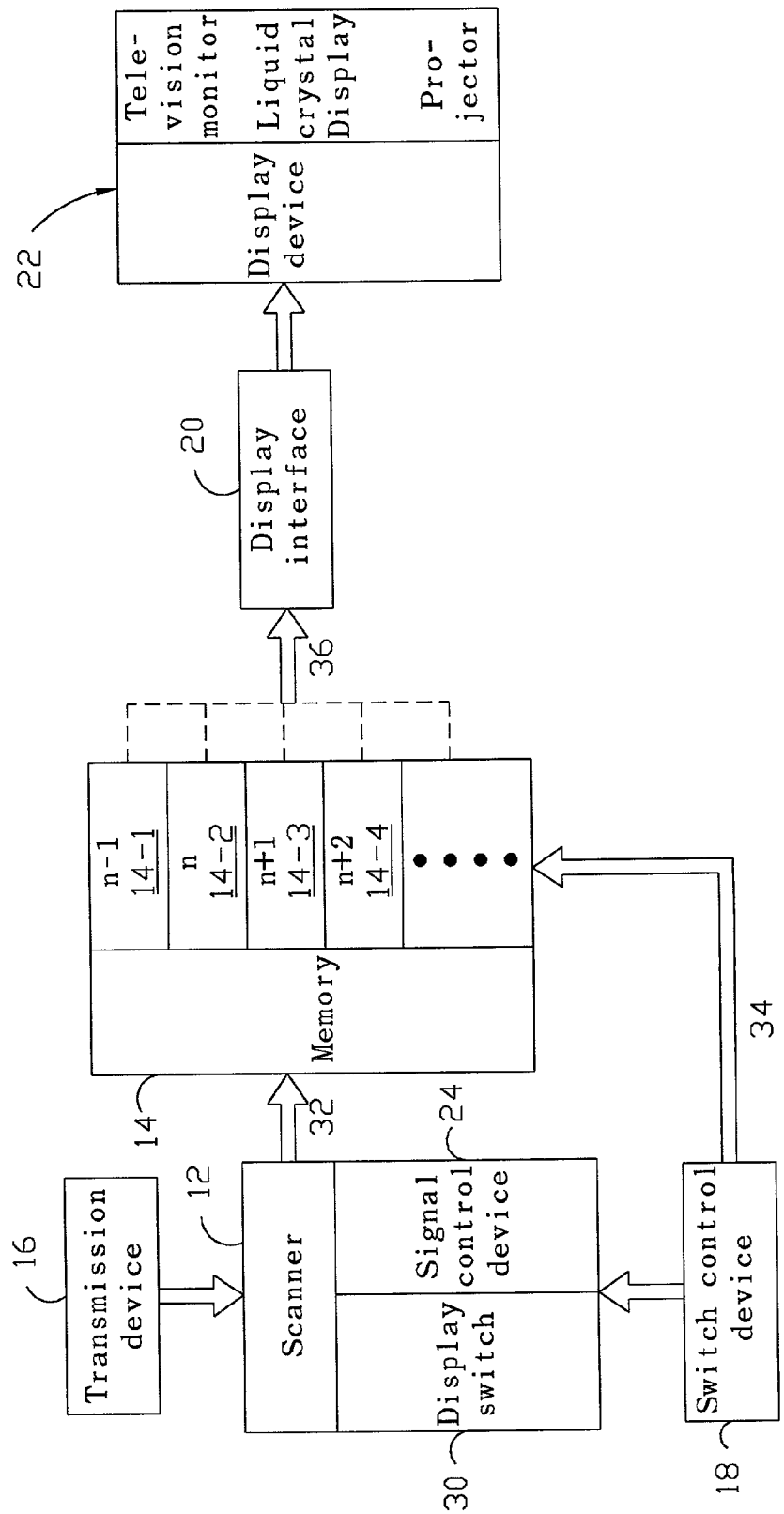
FIG. 2 is an schematically structural illustration of an image scanning system in accordance with the present invention.

Referring to FIG. 2, FIG. 2 is a schematically structural illustration of an image scanning system in accordance with the present invention. In accordance with the present invention, an image apparatus with batch scan and real time display and a method of the same are provided. The user adjusts the switch control device 18 to change an image that desires to display, and simultaneously drives the transmission device 16 for transmitting the next picture into the scanner to going on scanning. The image frame has a display switch 30 thereon which notify signals could represent to go forward, go backward, or just scan the next picture in time. The signal control device 24 is provided for the functions that process the switch signal and notify the transmission device 16 carrying the next picture into the scanner 12 to scan synchronously. With regard to the conventional scanners, the scanning time is about 7.68 seconds that the designated area of 1024*768 dpi by the scanning line about 10 milli-seconds. It is in need of more scanning time for scanning the designated area in higher resolution. Consequently, as the users change the present image into the next image, the users scan the next image and store the digital information into the memory 14 by an image data signal 32 in advance. When the users change to display the next image, the scanned image in the memory 14 is displayed by an index signal 34.

The memory 14 is a special kind of the memory buffer that can be used for storing the digital information of the scanner 12. A ring buffer and a ping-pong buffer can be used as the memory 14 shown in this invention. Suppose that the memory buffer shown in FIG. 2 has a memory buffer block 14-1, a memory buffer block 14-2, a memory buffer block 14-3 and a memory buffer block 14-4, etc. The first digital information is stored in the memory buffer block 14-1, and the second digital information is stored in the memory buffer block 14-2. Then storing in the follow-up memory buffer block in sequence until the memory buffer is filled with the digital information. The next digital information is stored in the memory buffer block 14-1 and covered over the prior information. It is a characteristic of the ring buffer, which storing mode is to be moved in circles. The ping-pong buffer is a kind of the ring buffer. The ping-pong buffer merely has two memory buffer blocks for storing the digital information in circulating mode. Therefore the number and size of the images allocate the capacity of the memory buffer. In response to the digital information of controlling by the image data signal 32 and the index signal 34, the digital information corresponding to the index of an image display signal 36 is displayed. Thereafter the digital data is transmitted onto a display device 22 by a display interface 20, in which the display device 22 can be a television, monitor, liquid crystal display or projector.

Figure 3:
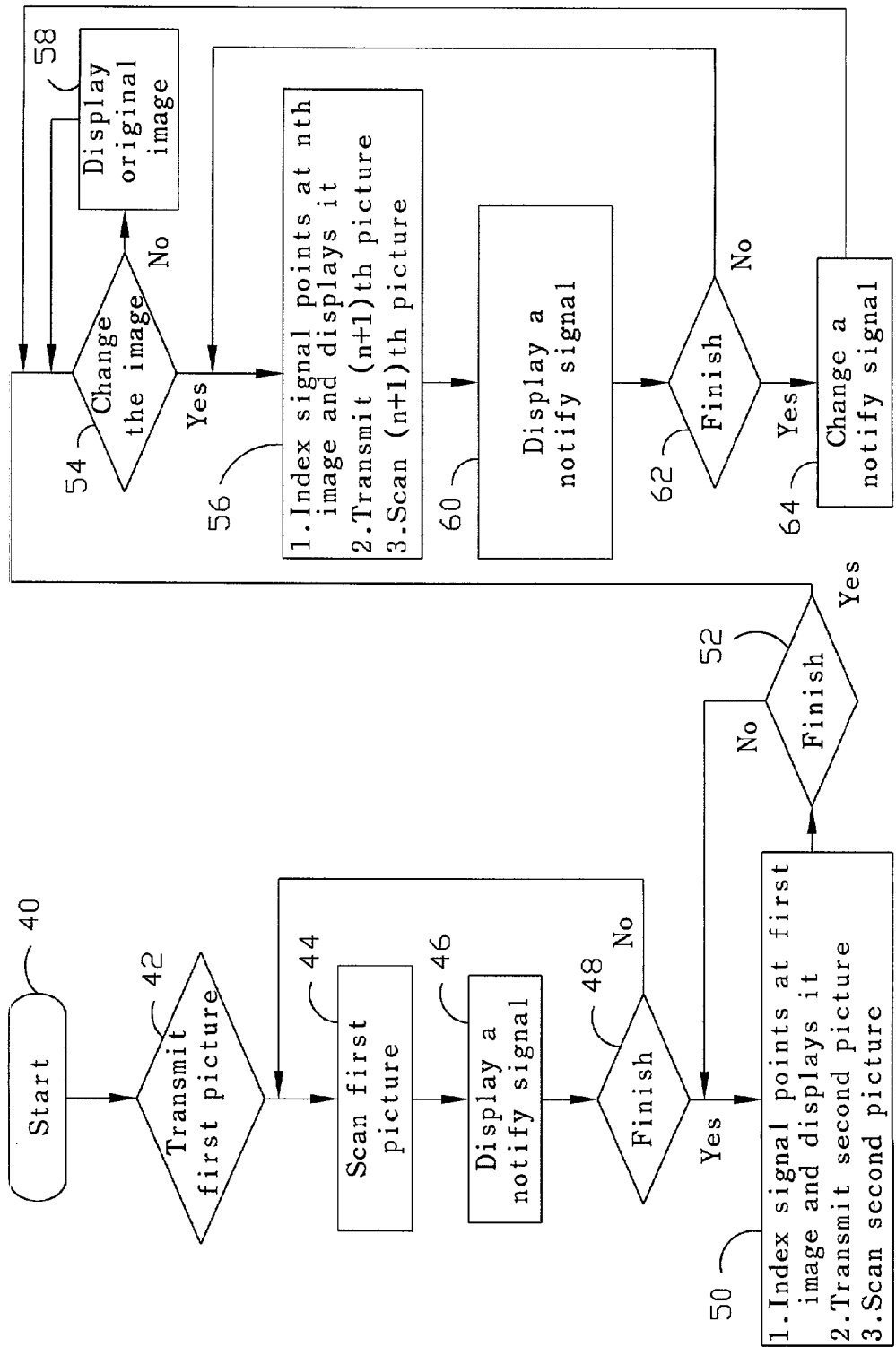
FIG. 3 is a flow diagram of synchronous scan and real display of an image scanning system shown in FIG. 1.

Referring to FIG. 3, and a detailed functional flow diagram of an image scanning system in accordance with the embodiments of the present invention is illustrated. The method of the invention starts from the step of 40, and the transmission device 16 transfers first picture into the scanner in the step of 42 firstly. In the step of 44, the picture is proceeded to scan, and moreover a notify signal on a display device is used to notify the user the present situation of scan in the step of 46. If scanning the picture is finished, the step of 48 is proceeding to go to the next step. Otherwise jump to the preceding step until the scan is finished. Next step of 50, the index signal points at a first image, and the first image is displayed on the display device. Simultaneously, the step notices the transmission device 16 transmitting a second picture into the scanner to scan. There was going on next step until scanning of the image is finished. The step of 54 waits the user to change the image. If the switch control device 18 is not turned on, the index signal points to display original image in the step of 58. If the switch control device 18 is turned on, the index signal points to display a next image. Synchronously, the transmission device 16 is provided for transmitting the next picture into the scanner and scanning the next picture in the step of 56. In next step of 60, there is a notify signal in the display device, which means that the picture is scanning right now. In the step of 62, the notify signal changes until scanning the picture is finished and jumps back to wait for a next change for showing a next image. If a scanning action is not finished, proceed to scan until that is finished. If the user changes to display the next image right now, the image will be displayed until scanning is ended.

Figure 4A:
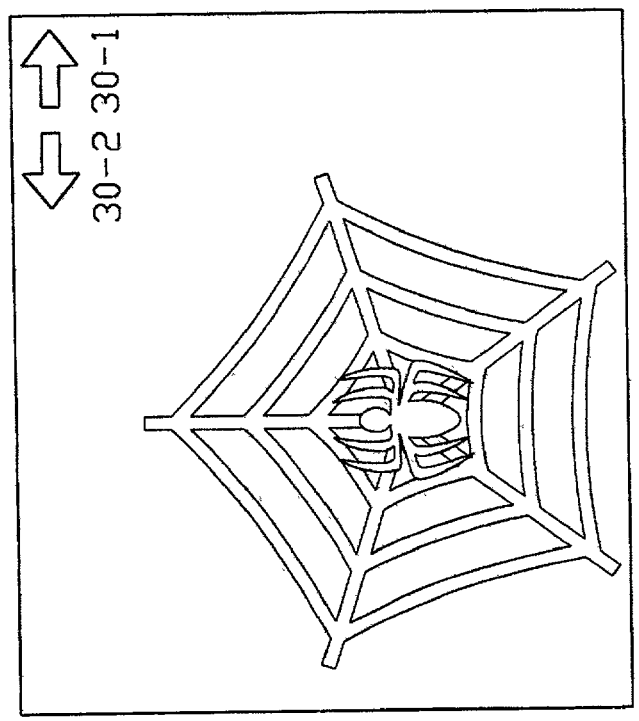
FIG. 4A is a schematic illustration of notify signals in an image display frame, a rightward arrow means that the next scanning image is unfinished, and a leftward arrow means that the previous scanning image is unfinished.
Figure 4B:
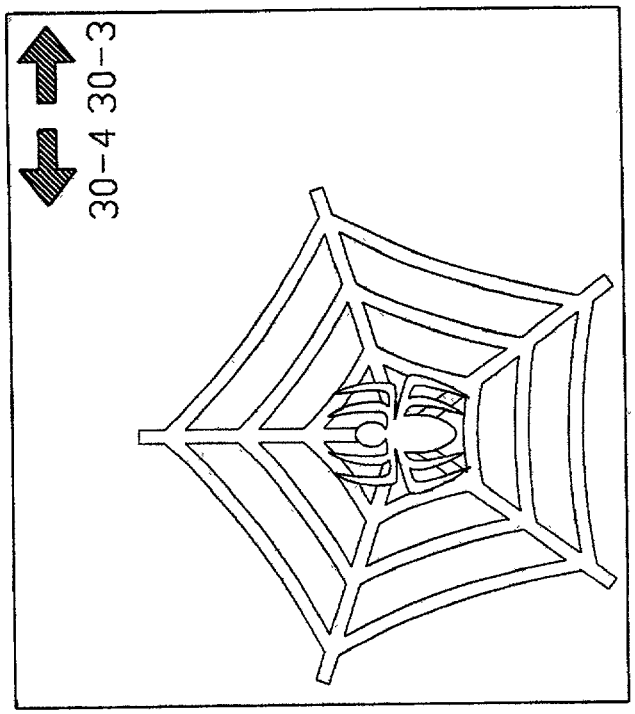
FIG. 4B is a schematic illustration of notify signals in an image display frame, a rightward arrow means that the next scanning image is finished, and a leftward arrow means that the previous scanning image is finished.

Furthermore referring to FIG. 4A and FIG. 4B, FIG. 4A and FIG. 4B are schematic illustrations of notify signals in a display frame, wherein notify signals in the display frame can be distinguished from the sign of arrow image, twinkle image or unlike color image. The notify signals indicate the condition of display and scan at present to supply a reference for users. The arrow sign is represented herein. A rightward arrow 30-1 means that the next image is in the act of scanning. There is no image to display until the scanning is finished. A leftward arrow 30-2 means that there is no previous image to display at present. A rightward arrow 30-3 means that the scanning of the next image is finished and a display switch 30 therein can represent to display the image. A leftward arrow 30-4 means that the previously scanned image can be displayed by a display switch.

Although specific embodiments have been illustrated and described, it will be obvious to those skilled in the art that various modifications may be made without departing from what is intended to be limited solely by the appended claims.

What is claimed is:

1. An apparatus, comprising:
   a scanner configured to scan a first document;
   a memory configured to store image data corresponding to said first document;
   a signal control device configured to generate a notify signal in response to said image data being stored in said memory; and
   a switch control device configured to receive a first signal to display said first document on a display device, wherein said switch control device is further configured to request a transmission of a next document to be scanned, wherein said scanner is further configured to transmit said next document substantially concurrently with a displaying of said first document, and wherein said next document is not displayed on said display device unless the switch control device receives a second signal to display said next document.

2. The apparatus according to claim 1, further comprising a transmission device configured to transmit said first document to be scanned.

3. The apparatus according to claim 2, wherein said transmission device comprises a document handling device selected from the group comprising a positive photograph holder, a negative photograph holder, and an automatic document feeder.

4. The apparatus according to claim 1, wherein said memory comprises a buffer selected from the group comprising a ring buffer and a ping-pong buffer.

5. The apparatus according to claim 4, wherein said buffer comprises two or more memory buffer blocks.

6. The apparatus according to claim 1, further comprising a display switch configured to receive said notify signal and to display a notification of availability of said first document on said display device.

7. The apparatus according to claim 1, wherein said signal control device is further configured to determine a scanning status of said next document being scanned, and wherein scanning status is configured to be displayed on said display device together with said first document.

8. The apparatus according to claim 7, wherein said scanning signal indicates when the scanning of said next document has finished.

9. The apparatus according to claim 7, wherein said notify signal is displayed while said next document is being scanned.

10. An image scanning system, comprising:
    a scanner configured to scan a first document;
    a transmission device configured to transmit said first document to be scanned;
    a memory configured to store image data corresponding to said first document;
    a signal control device configured to produce one or more signals including a notify signal in response to the image data corresponding to said first document being stored in said memory;
    a display switch configured to receive the notify signal and to display a notification of availability of said first document on a display device; and
    a switch control device configured to receive a starting signal to display said first document on said display device, and further configured to notify said transmission device to transmit a second document to be scanned, wherein said display device is configured to display said first document while said second document is being scanned, and wherein said signal control device is further configured to produce a scanning signal corresponding to a scanning status of said second document.

11. The system according to claim 10, wherein said memory comprises one or more buffers selected from the group comprising a ring buffer and a ping-pong buffer.

12. The system according to claim 11, wherein said memory comprises two or more memory buffer blocks.

13. The system according to claim 10, wherein said scanning signal indicates when the scanning of said next document has finished.

14. The system according to claim 13, wherein a selection of the notification of availability causes said switch control device to receive a next image signal to display said second document on said display device in place of said first document.

15. The system according to claim 10, wherein said transmission device comprises a document handling device selected from the group comprising a positive photograph holder, a negative photograph holder, and an automatic document feeder.

16. The image scanning system according to claim 10, wherein said signal control device is further configured to produce a second notify signal in response to image data corresponding to said second document being stored in said memory.

17. A scanning method, comprising:
    scanning a first document;
    storing said first document into a memory;
    receiving a starting signal;
    displaying said first document;
    scanning a next document substantially concurrently with the displaying of said first document, wherein said next document is not displayed while it is being scanned; and
    displaying a scanning status of said next document while said first document is being displayed, wherein said scanning status indicates an availability of said next document for display on said display screen.

18. The method according to claim 17, further comprising automatically transmitting said next document to be scanned into a scanner, wherein said next document is transmitted at the same time as said first document is being scanned by said scanner.

19. The method according to claim 17, further comprising displaying said next document in place of said first document.

20. The method according to claim 19, wherein said next document is not displayed unless a second signal is received.

21. The method according to claim 17, wherein said notification of availability comprises an image selected from the group comprising an arrow image, a twinkling image, and an unlike color image.

22. The method according to claim 17, wherein displaying said first document includes displaying said first document on a display device, and wherein said display device comprises a peripheral selected from the group comprising a television, a monitor, a liquid crystal display, and a projector.

23. The method according to claim 17, wherein said memory comprises a buffer selected from the group comprising a ring buffer and a ping-pong buffer.

24. The method according to claim 23, wherein said memory comprises two or more memory buffer blocks.

25. A scanning method, comprising:
transmitting a first document to a scanner;
scanning said first document and storing said first document to a memory;
displaying a notification of availability on a display device to notify a user of an availability of said first document for display on said display device; and
utilizing a switch control device to receive a starting signal to display said first document on said display device, and further to notify a transmission device to transmit a second document into said scanner substantially concurrently with the displaying of said first document, wherein said second document is scanned and stored into said memory without being displayed on said display device.

26. The method according to claim 25, wherein said transmission device comprises a document handling device selected from the group comprising a positive photograph holder, a negative photograph holder, and an automatic document feeder.

27. The method according to claim 25, wherein said memory comprises a buffer selected from the group comprising a ring buffer and a ping-pong buffer.

28. The method according to claim 27, wherein said memory comprises two or more memory buffer blocks, and further wherein the capacity of said memory is determined by the user.

29. The method according to claim 25, wherein said notification of availability comprises an image selected from the group comprising an arrow image, a twinkling image, and an unlike color image.

30. The method according to claim 25, wherein said display device comprises a peripheral selected from the group comprising a television, a monitor, a liquid crystal display, and a projector.

31. The scanning method of claim 25, further comprising displaying a second notification of availability on said display device to notify said user of an availability of said second document for display on said display device.

32. An apparatus, comprising:
a scanner configured to scan a first document and a second document;
a switch configured so that a display of said first document occurs concurrently with the scanning of said second document; and
a display screen configured to display a scanning status of said second document while displaying said first document, wherein said scanning status indicates an availability of said second document for display on said display screen, and wherein said second document is scanned without displaying said second document on said display screen.

33. The apparatus of claim 32, further comprising a transmission device configured to transmit said first document to be scanned, wherein said switch is further configured to request said transmission device to transmit said second document to said scanner prior to said second document being scanned.

34. The apparatus of claim 32, further comprising a signal control device configured to generate a notify signal.

35. The apparatus of claim 32, wherein said switch is further configured to receive a start signal from a user interface, and wherein the display of said first document occurs at least in part in response to receiving said start signal from said user interface.

36. An article of manufacture including a computer-readable storage medium having stored thereon instructions that, if executed by a computing device, cause the computing device to perform a method comprising:
scanning a first document;
storing said first document into a memory;
receiving a starting signal;
displaying said first document;
automatically transmitting a next document into a scanner substantially concurrently with the displaying of said first document, wherein said next document is configured to be scanned by said scanner without being displayed; and
scanning said next document while said first document is being displayed.

37. The article of manufacture according to claim 36, wherein said method further comprises displaying a notification of availability of said next document while said next document is being scanned.

38. The article of manufacture according to claim 36, wherein said memory comprises two or more memory buffer blocks.

39. The article of manufacture according to claim 36, wherein said method further comprises displaying a scanning condition of said next document together with the displaying of said first document.

40. The article of manufacture according to claim 36, wherein said next document is automatically transmitted into said scanner by a transmission device, and wherein said first document is scanned by said scanner.

* * * * *